(12) United States Patent
Liu et al.

(10) Patent No.: US 10,496,655 B2
(45) Date of Patent: Dec. 3, 2019

(54) EVENT ANALYSIS APPARATUS, EVENT ANALYSIS SYSTEMS, EVENT ANALYSIS METHODS, AND EVENT ANALYSIS PROGRAM

(71) Applicant: YOKOGAWA ELECTRIC CORPORATION, Tokyo (JP)

(72) Inventors: Zhuo Liu, Tokyo (JP); Yuichi Sakuraba, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 321 days.

(21) Appl. No.: 15/341,483

(22) Filed: Nov. 2, 2016

(65) Prior Publication Data
US 2017/0132292 A1    May 11, 2017

(30) Foreign Application Priority Data

Nov. 6, 2015    (JP) .................................. 2015-218894

(51) Int. Cl.
*G06F 16/2458* (2019.01)
*G06F 7/08* (2006.01)
(Continued)

(52) U.S. Cl.
CPC ............ *G06F 16/2465* (2019.01); *G06F 7/08* (2013.01); *G06F 11/302* (2013.01); *G06F 11/3006* (2013.01); *G06F 11/3476* (2013.01)

(58) Field of Classification Search
CPC ............ G06F 11/3476; G06F 11/3006; G06F 11/302; G06F 17/30539; G06F 7/08;
(Continued)

(56) References Cited

U.S. PATENT DOCUMENTS

2006/0116943 A1*  6/2006  Willain .................. G06Q 40/00
                                                                705/35
2010/0026511 A1*  2/2010  Akao .................. G06F 11/0751
                                                                714/26
(Continued)

FOREIGN PATENT DOCUMENTS

JP           10-27104 A      1/1998
JP        2007-316681 A     12/2007
JP         2012-37787 A      2/2012

OTHER PUBLICATIONS

Kenji Kataoka, et al., "Implementation of Operator Support System using Dynamic Simulator for Abnormal Plant Condition," International Conference on Computational Intelligence for Modelling Control and Automation, and International Conference on Intelligent Agents, Web Technologies and Internet Commerce, IEEE, PI, Nov. 1, 2006, pp. 1-6.

*Primary Examiner* — Phong H Nguyen
(74) *Attorney, Agent, or Firm* — Sughrue Mion, PLLC

(57) ABSTRACT

An event analyzer includes: an event collector configured to collect event log data representing operation history which an DCS operator performed; a basic unit operation analyzer configured to analyze event log data, and extract basic unit operation data representing operation method based on the operation by the DCS operator; and an unit operation analyzer configured to analyze basic unit operation data, and extract unit operation data representing intention of the operation by the DCS operator.

17 Claims, 11 Drawing Sheets

(51) Int. Cl.
*G06F 11/30* (2006.01)
*G06F 11/34* (2006.01)

(58) Field of Classification Search
CPC .. G06F 16/2465; G06F 16/22; G06F 16/2462;
G06F 16/248; G05B 23/0237; G05B
2219/23434; G05B 2219/23026; G05B
19/0426; G05B 23/0235; G05B 23/024
USPC .......................................... 707/737, 754, 758
See application file for complete search history.

(56) References Cited

U.S. PATENT DOCUMENTS

| | | | |
|---|---|---|---|
| 2014/0096181 A1* | 4/2014 | Rivers .................... | G06F 21/552 726/1 |
| 2014/0188779 A1* | 7/2014 | Sakuraba ........... | G05B 23/0275 706/52 |
| 2014/0317040 A1* | 10/2014 | Liu ..................... | G06K 9/6296 706/46 |

\* cited by examiner

FIG. 2

| EVENT ID | DATE AND TIME | TAG NAME | OPERATION TYPE | PREVIOUS VALUE | PRESENT VALUE |
|---|---|---|---|---|---|
| 1 | 2015/8/21 10:00:00 | TAG1 | MAN | AUT | MAN |
| 2 | 2015/8/21 10:00:10 | TAG1 | MV | 25.0 | 30.0 |
| 3 | 2015/8/21 10:00:30 | TAG1 | MV | 30.0 | 35.0 |
| 4 | 2015/8/21 10:00:50 | TAG2 | SV | 91.0 | 89.0 |
| 5 | 2015/8/21 10:01:00 | TAG1 | MV | 35.0 | 40.0 |
| 6 | 2015/8/21 10:02:50 | TAG2 | SV | 89.0 | 90.0 |
| 7 | 2015/8/21 10:03:00 | TAG1 | AUT | MAN | AUT |
| 8 | 2015/8/21 10:03:01 | TAG1 | SV | 2.0 | 3.0 |
| ⋮ | ⋮ | ⋮ | ⋮ | ⋮ | ⋮ |

FIG. 3

| BASIC UNIT OPERATION ID | STARTING DATE AND TIME | ENDING DATE AND TIME | TAG NAME | OPERATION TYPE | OPERATION METHOD | EVENT ID |
|---|---|---|---|---|---|---|
| No. 1 | 2015/8/21 10:00:00 | 2015/8/21 10:00:00 | TAG1 | MAN | MODE CHANGE | No. 1 |
| No. 2 | 2015/8/21 10:00:10 | 2015/8/21 10:01:00 | TAG1 | MV | RAMPING + | No. 2, No. 3, No. 5 |
| No. 3 | 2015/8/21 10:00:50 | 2015/8/21 10:02:50 | TAG2 | SV | FINE-TUNING | No. 4, No. 6 |
| No. 4 | 2015/8/21 10:03:00 | 2015/8/21 10:03:00 | TAG1 | AUT | MODE CHANGE | No. 7 |
| No. 5 | 2015/8/21 10:03:01 | 2015/8/21 10:03:01 | TAG1 | SV | SETTING CHANGE + | No. 8 |
| ... | ... | ... | ... | ... | ... | ... |

FIG. 4

| UNIT OPERATION ID | STARTING DATE AND TIME | ENDING DATE AND TIME | TAG NAME | OPERATION INTENTION | BASIC UNIT OPERATION ID |
|---|---|---|---|---|---|
| No. 1 | 2015/8/21 10:00:10 | 2015/8/21 10:03:01 | TAG1 | INCREASING THE FLOW AMOUNT | No. 1, No. 2, No. 4, No. 5 |
| No. 2 | 2015/8/21 10:00:50 | 2015/8/21 10:02:50 | TAG2 | FINE-TUNING OF THE TEMPERATURE | No. 3 |
| ... | ... | ... | ... | ... | ... |

…

EVENT ANALYSIS APPARATUS, EVENT ANALYSIS SYSTEMS, EVENT ANALYSIS METHODS, AND EVENT ANALYSIS PROGRAM

BACKGROUND OF THE INVENTION

Field of the Invention

The present invention relates to an event analyzer, an event analysis system, an event analysis method, and an event analysis program, analyzing an event log data of the event which a DCS operator operated and extracting an abstracted operation representing an operation method and intention of the operation of the event log which the DCS operator operated.

Priority is claimed on Japanese Patent Application No. 2015-218894, filed Nov. 6, 2015, the content of which is incorporated herein by reference.

Description of the Related Art

A control system such as DCS (Distributed Control System) may often record an event log of a operation by a DCS operator as an event log data. Not only an operation history but also histories of an alarm and guidance may be recorded in the event log database as the event log data. The user of the control system improves the control system which the DCS operator operated, by analyzing examples of efficiently performed operation and such case an alarm is generated due to the operation, with reference to past events log data. An event analyzer may be used for the analysis of the event log data as described above.

FIG. 12 is a block diagram showing a functional configuration of a prior event analyzing system 3 and event analyzer 30. As shown in FIG. 12, the event analyzing system 3 includes, an event analyzer 30, an event log database 31, a display 33, a control system 34, and a historian 35. Further, as shown in FIG. 12, the event analyzer 30 includes an event collector 301, the event analyzer 303, and an analysis result output unit 304.

Event Collector 301 collects the event log data from the control system 34 and the historian 35, records the event log in the event log database 31. The event analyzer 303 analyzes such a cluster analysis of the event and an aggregation of the number of the event, using the event log data stored in the event log database 31. An analysis result output unit 304 generates an operation event list based on the analysis result of the event log data. The analysis result output unit 304, creates (visualizes) a table and a graph showing the results of statistical processing of the event log analysis results, and displays them on the display 32. Thus, an user of the control system, can improve an operation of the DCS operator in the control system by utilizing the event analyzer 30.

For example, in a control system for controlling the plant (e.g., DCS), a DCS operator manually performs the plant control operation. In the case, the DCS operator may often not complete the plant control operation such as setting value change at once but perform the operation dividing into multiple times. For example, in a case that the DCS operator adjusts an operation amount of the plant control operation until a process value (current value) reaches a target value, may often divide the plant control operation into multiple operations, even an operation intention is one. That is, in a case that the DCS operator adjusts the operation amount of the plant control operation so as to reach the process value to the target value, the DCS operator adjusts the operation amount of the plant control operation so as to gradually approach the process value to the target value. In the case, each event log would be generated for each operation by dividing the plant control operation into multiple operations. Therefore, it is difficult for the user of the control system that finds a sequential of the operation intention indicating the event log from each of the event log.

Conventional general event analyzer displays the event log data representing an operation history, and performs the statistical processing or the like. The user can grasp rough statistical data such as an operation frequency by utilizing a conventional event analyzer. However, in a case that the user analyzes a past operation cases to identify the operation to be the target of the operational improvements, as described above, it is difficult for the user to extract the operation intention of the DCS operator represented by the sequences of operation events, simply by individually analyzing the operation event.

The operating procedures creation support apparatus described in Japanese Patent Application Publication No. 2007-316681 reduces the number of events for representing to the user by extracting only the events at the starting operation based on the continuity of the event log data. However, in a case that the user simply displays only the event at the starting operation, a progress information representing a progress status of the subsequent operations would be missing. Therefore, it is difficult for user to infer the operation intention what kind of changes the DCS operator finally wants to give to the process. Further, since the user cannot read what kind of operation method the DCS operator used to change the setting value, it is difficult for the use to extract the knowledge of the operations operated by the skilled DCS operator.

DISCLOSURE OF THE INVENTION

Problems to be Solved by the Invention

Some embodiments of the present invention relate to an event analyzer, an event analysis system, an event analysis method, and the event analysis program, capable of extracting an operation method used by the DCS operator and an operation intention of the DCS operator.

SUMMARY (1) Some embodiments of the present invention provide an event analyzer. The event analyzer includes: an event collector configured to collect event log data representing operation history which an DCS operator performed; a basic unit operation analyzer configured to analyze event log data, and extract basic unit operation data representing operation method based on the operation by the DCS operator; and an unit operation analyzer configured to analyze basic unit operation data, and extract unit operation data representing intention of the operation by the DCS operator.

(2) Furthermore, in the event analyzer described above, the event collector is configured to collect a plurality of event log data arranged in time series, the basic unit operation analyzer is configured to extract one or more of basic unit operation data and analyze one or more of the event log data, and the unit operation analyzer is configured to analyze basic unit operation data extracted and extract unit operation data representing intention of the operation by the DCS operator.

(3) Furthermore, in the event analysis device described above, the basic unit operation analyzer is configured to analyze at least one of continuity of time and change of setting value based on the event log data, and determine the operation method to extract the basic unit operation data.

(4) Furthermore, in the event analysis device described above, the basic unit operation analyzer is configured to analyze at least one of continuity of time and change of setting value based on the event log data, and determine the operation method to extract the basic unit operation data.

(5) Furthermore, in the event analysis device described above, the basic unit operation analyzer is configured to analyze at least one of continuity of time and change of setting value based on the event log data, and determine the operation method to extract the basic unit operation data.

(6) Furthermore, in the event analysis device described above, an analysis result output unit is configured to output analysis result data representing the basic unit operation or the unit operation on time axis based on the basic unit operation data or the unit operation data.

(7) Furthermore, in the event analysis device described above, an analysis result output unit is configured to output analysis result data representing the basic unit operation or the unit operation on time axis based on basic unit operation data or unit operation data; and a display configured to display in a visual manner analysis data outputted from the analysis result output unit.

(8) Furthermore, in the event analysis device described above, an operation procedure analyzer is configured to analyze sequences of basic unit operation data or unit operation data, and extract an operation procedure for which the DCS operator performs an alarm response and a steady operation.

(9) Furthermore, in the event analysis device described above, an operation procedure analyzer is configured to analyze sequences of basic unit operation data or unit operation data, and extract an operation procedure for which the DCS operator performs an alarm response and a steady operation; and a speaker configured to announce in an auditory manner the operation procedure extracted by the operation procedure analyzer.

(10) Furthermore, in the event analysis device described above, a log data administrator is configured to output event log data indicating operation history which an DCS operator performed; an event collector configured to collect event log data; a basic unit operation analyzer configured to analyze the event log data and extract basic unit operation data representing a operation method based on the operation which the DCS operator performed; and an unit operation analyzer configured to analyze basic unit operation data extracted by the basic unit operation analyzer and extract unit operation data representing operation intention of the operation which the DCS operator performed.

(11) In the event analysis method, an event analysis method using a computer includes: an event collecting step of collecting event log data representing operation history which an DCS operator performed; a basic unit operation analyzing step of analyzing event log data collected in the step of collecting the event and extracting basic unit operation data representing an operation method operated by the DCS operator; and an unit operation analyzing step of analyzing basic unit operation data extracted by the basic unit operation analyzer in the basic unit operation analyzing step and extracting unit operation data representing operation intention of the operation by the DCS operator.

(12) In the event analysis device, an event analysis program executed by a computer includes: an event collecting step of collecting event log data representing operation history which an DCS operator performed; a basic unit operation analyzing step of analyzing event log data and extracting basic unit operation data representing a operation method operated by the DCS operator; and an unit operation analyzing step of analyzing the basic unit operation data and extracting unit operation data representing a operation intention of the operation which the DCS operator performed.

According to the present invention, it is possible to extract the operation intention of the DCS operator and operation method used by the DCS operator.

BRIEF DESCRIPTION OF THE DRAWINGS

FIG. 2 is a diagram showing an example of the event log table stored in the event log database of the events analysis system according to the first embodiment of the present invention.

FIG. 3 is a diagram showing an example of a basic unit operation table the analysis result database of the event analysis system stores according to an embodiment of the present invention.

FIG. 4 is a diagram showing an example of the unit operation table the analysis result database of the event analysis system stores according to an embodiment of the present invention.

DETAILED DESCRIPTION OF THE PREFERRED EMBODIMENTS

Figure 1:
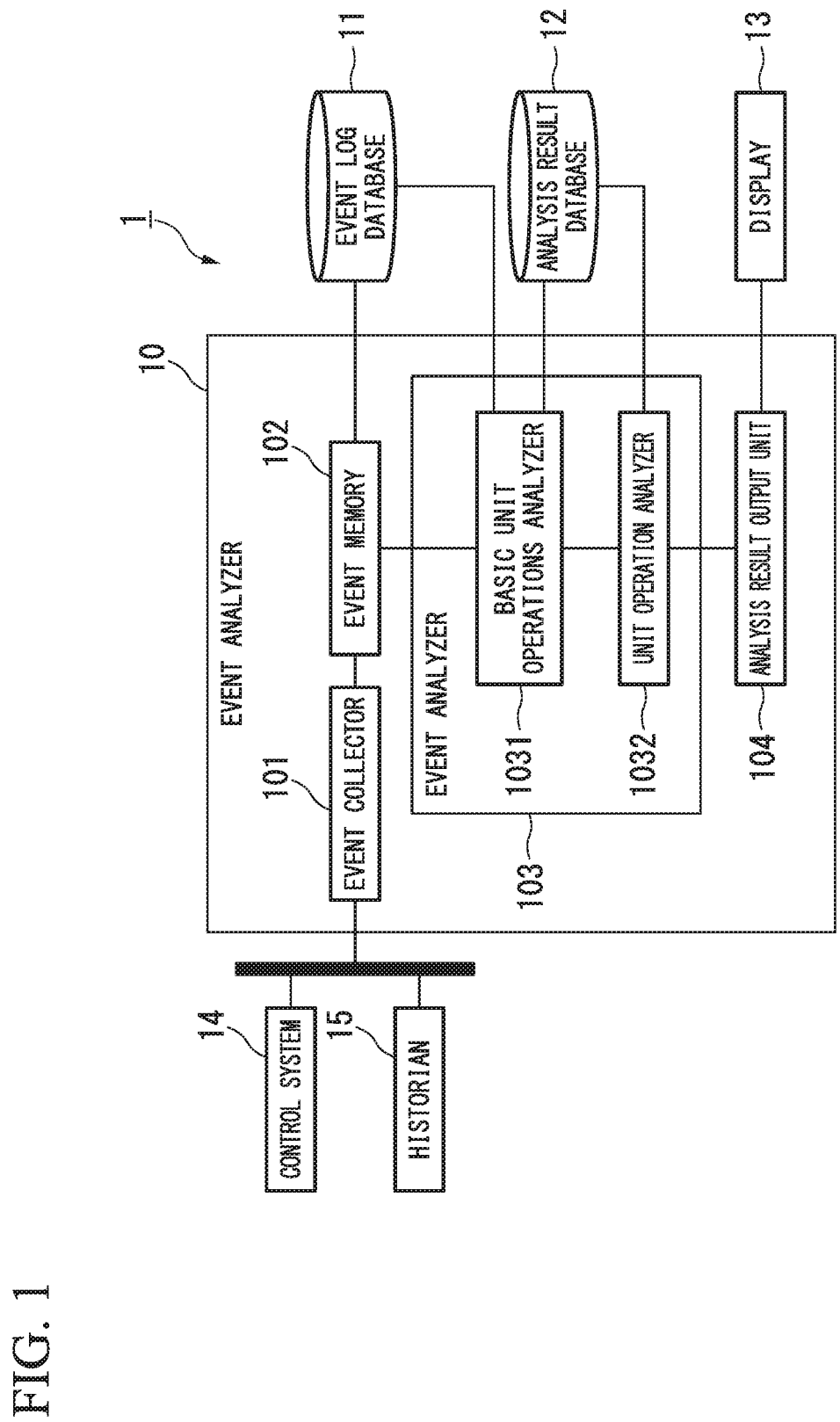
FIG. 1 is a block diagram showing a functional configuration of an event analysis system and an event analyzer according to the first embodiment of the present invention.

Hereinafter, a number of embodiments of the present invention will be described below, with references made to the drawings.

First Embodiment

An event analysis system according to the present embodiment extracts an operation intention and operation methods of the DCS operator from the event log data representing an operation history of the control system operated by the DCS operator. In general, the DCS operator increases or decreases SV value (Set Variable) and MV value (Manipulated Variable) to increase or decrease the process values such as flow amount and pressure. In addition, the DCS operator performs operations such as fine-tuning the process value in order to keep the value such as flow amount and pressure constant. That is, the intention of the DCS operator's operations is to make the process value as the target increasing, decreasing, or stable. In the present invention, the event analyzer extracts the intention of the operation by the DCS operator. The DCS operator may have one or more of the operation intentions.

The terms "operational intention" or "intension" refer to a purpose of operation that a DCS operator performed, or the reason for the operation such as changing an operation mode between automatic operation mode and manual operation mode and changing an operation method between increasing and decreasing a flow rate, or pressure.

For example, in a case that the DCS operator may increase the process value, the event analyzer can change the setting of the SV value and the MV value by a ramping which is the operation gradually changing the SV value and MV value. Further, the DCS operator can change the setting of the SV value and the MV value in one operation. Thus, there are multiple types of the operation methods based on the operation based on the same intent of the DCS operator. Furthermore, the operation of ramping may be decomposed into more detailed operations. Therefore, the embodiment of the present invention, a "Basic unit operation" representing the operation method is defined by gathering the event log data of the plurality of operations. Further, the embodiment of the present invention, an "unit operation" representing the operation intent is defined by gathering a plurality of basic unit operations. In the ramping operation to change the SV value and MV value, as an example, if the DCS operator gradually increases the SV value and MV value, the event log data is divided into a plurality of the operations to be collected in time series from the starting of the operation to the ending of the operation by the DCS operator. That is, the ramping operation from the starting of the operation to the ending of the operation includes a plurality of event log data. The basic unit operation that gathers a plurality of event log data leads to be understanding how to operate in the DCS operator. The unit operation that gathers the basic unit operation leads to be understood the operation intention of the DCS operator.

It may be defined any of the four types such as an "increase", a "decrease", a "fine-tuning" and a "decrease" in the unit operations. The "increase and decrease" may refer to the unit operation which is repeated increasing and decreasing in short interval. It is also possible to define a unit operation other than the four types unit operations described above. In addition, as the basic unit operations, it is defined any of the five types such as a "ramping (increase)," a "ramping (decrease)", a "fine-tuning", a "setting change (increase)", and a "setting change (decrease)".

Incidentally, there exist the ramping operation for gradually increasing the SV value and the MV value, and the ramping operation for gradually decreasing the SV value and the MV value, in the ramping. Thereby, in the embodiment of the present invention, the ramping operation to make such as the SV value and the MV value increase is to be referred to as a "ramping +", and the ramping operation to make such as the SV value and the MV value decrease is to be referred to as a "ramping −". In addition, the setting change makes the value greatly change in a single operation. As in the case of the ramping, the setting change operation to make such as the SV value and the MV value increase is to be referred to as a "setting change +", and the setting change operation to make such as the SV value and the MV value decrease is to be referred to as a "setting change −".

It is possible to define the basic unit operation other than the five types basic unit operation described above, as well as the unit operation. The unit operation is higher degree abstract than the basic unit operation. Therefore, the analysis process of the event log data is a two-stage extraction process such as firstly extracting the basic unit operations from the event log data, and then extracting the unit operations from the extracted basic unit operation.

(The Configuration of the Event Analysis System)

Next, the configuration of the event analysis system 1 according to the first embodiment will be described with reference to the drawings.

FIG. 1 is a block diagram showing a functional configuration of an event analysis system and an event analyzer according to the first embodiment of the present invention. The event analyzer 1 according to the first embodiment includes an event analyzer 10, an event log database 11, an analysis result database 12, a display 13, a control system 14, and a historian 15.

The event analyzer 10 collects the event log data from the control system 14 and the historian 15. The event analyzer 10 records the collected event log data in the event log table stored in the event log database 11. In addition, the event analyzer 10 analyzes the event log data recorded in the event log table. The analysis process includes an event cluster analysis, an aggregation of the number of events, and an analysis processing such as the basic unit operation and an extraction of the basic unit operation. Then, the event analyzer 10 records the analysis result in the basic unit operation table and the unit operation table stored in the analysis result database 12.

In addition, the event analyzer 10 visualizes the above analysis results by converting to the format such as tables and graphs, and displays them on the display 13. The event analyzer 10 displays the operation method and the operation intention of the DCS operator performed the event from the analysis result. The event analyzer 10 includes a computer, such as a personal computer and a general-purpose computer.

The event log database 11 is a database for storing an event log table. The event analyzer 10 records an event log data in the event log table. If the operation of one unit includes a plurality of event log data arranged in time series, the plurality of event log data is recorded in the event log table in one unity or in sets. The event log database 11 includes, for example, a storage medium such as a HDD (Hard Disc Drive). The basic unit operation table and the unit operation table are stored in the analysis result database 12. The analysis result data representing the analysis result of the event log data which the event analyzer 10 performed is recorded in the basic unit operation table and the unit operation table. The analysis result database 12, for example, includes a storage medium such as the HDD.

The control system 14 controls the plant (not shown). The control system 14 includes, for example, the DCS. The historian 15 automatically collects enormous control data (event log data) generated in the control system 14. The historian 15 is a database for long-term storage. The historian 15, for example, includes a storage medium such as the HDD.

(The Configuration of the Event Analyzer)

Next, the configuration of the event analyzer 10 according to the first embodiment will be described with reference to FIG. 1. The event analyzer 10 includes an event collector 101, an event memory 102, an event analyzer 103, and an analysis result output unit 104. Further, the event analyzer 103 includes a basic unit operation analyzer 1031, and a unit operation analyzer 1032.

The event Collector 101 collects the event log data from the control system 14 and the historian 15. The event log data represents an event history such as the operation of the control system 14 by the DCS operator. The event collector 101 outputs the collected event log data to the event memory 102. The event memory 102 records the event log data input from the event collector 101 in the event log table stored in the event log database 11.

Examples of the event log table stored in the event log database 11, and the event log data recorded in the log table will be described with reference to FIG. 2. FIG. 2 is a diagram showing an example of the event log table stored in the event log database of the events analysis system according to the first embodiment of the present invention. As shown in the FIG. 2, the event log table is a two-dimensional table format which may include a column of six data items such as an "event ID", a "date and time", a "tag name", an "operation type", a "previous value", and a "present value". Each line included in the event log table is respectively one event log data.

In the item of the "event ID (Identifier)", a value representing the identifier for uniquely identifying each event is stored. In the item of the "date and time", a value representing the time which each event occurs in the control system 14 (i.e., the date and time the event log data was generated) is stored. The time which the event occurred is the time which the DCS operator starts the operation of the one unit. In the item of the "tag name", in the case that a plurality of the control system 14 exists, a value representing the device identifier (tag) for uniquely identifying the control system 14 that generated the event logs data is stored. In the item of the "operation type", a value representing the identifier representing a sequential or a unit of the type of operation performed by the DCS operator is stored. In the item of the "previous value", a value representing the setting value (previous value) before the DCS operator operates the change operation of the setting value is stored. In the item of the "current value", a value representing the setting value (the current value) after the DCS operator operates the change operation of the setting value is stored. In another example, in the item of the "current value", a value representing the setting value (the current value) as the result which the DCS operator operates the change operation of the setting value. Incidentally, the format of the event log table is not limited to the example described above.

For example, the first event log data shown in FIG. 2 represents that the DCS operator changes an operating mode of the "TAG1" device from "AUT" to "MAN" at "Aug. 21, 2015 at 10:00:00". It should be noted that, the "AUT" means an automatic operation, and the "MAN" means a manual operation. Subsequently, the second event log data shown in FIG. 2 represents that the DCS operator changes the setting value of the "MV (operation amount)" of the "TAG1" device from "25.0(%)" to "30.0(%)" at "Aug. 21, 2015 at 10:00: 10".

Returning to FIG. 1 again, the configuration of the event processor according to the first embodiment will be described below. The event analyzer 103, for example, may extract the operation easy for the user to understand dividing into two stages from the event log data. First, in the first stage, the event analyzer 103 gathers the event log data, and extracts the basic unit operation representing the operation method. Then, in a second stage, the event analyzer 103 gathers the basic unit operations, and extracts the unit operation representing the operation intention of the DCS operator. The basic unit operations analyzer 1031 and the unit operations analyzer 1032 provided in the event analyzer 103 respectively perform these extraction processes. The event analyzer 103 may gather one or more event log data and extract the basic unit operation representing the operation method in the operation of a sequential or a unit. The event analyzer 103 may gather one or more of the basic unit operations and extract the unit operations representing the operation intention of the DCS operator in the operation of a sequential or a unit.

The basic unit operation analyzer 1031 analyzes the characteristics represented by the continuity in time and the change of the setting values based on the event log data. Then, the basic unit operation analyzer 1031 determines the operation method such as the ramping and the fine-tuning, and extracts the basic unit operation. The basic unit operation, as described above, represents an operating method the DCS operator performed. The basic unit operation analyzer 1031 extracts the event log data group which is an event log data group using the identical device and the same type operation types, extracts the basic unit operation based on the changing trend of the setting value and the continuity of the time in the event log data group. The event log group is the group of the event log data which the value of the items in the "tag name" is identical, and the value of the item of "operation type" is identical in the event log table stored in the event log database 11. The basic unit operation analyzer 1031 records the extracted the event log data representing the basic unit operation (hereinafter, referred to as the basic unit operation data) in the basic unit operation table stored in the analysis result database 12.

The basic unit operation analyzer 1031, for example, acquires the information representing that the event memory 102 recorded the event log data in the event log table stored in the event log database 11 from the event memory 102. The basic unit operations analyzer 1031 implements the extraction process and the recording process of the basic unit operation data as described above in the timing which the basic unit operations analyzer 1031 acquired the information.

An example of the basic unit operation table stored in the analysis result database 12 and the basic unit operation table recorded in the basic unit operation table will be described with reference to FIG. 3. FIG. 3 is a diagram showing an example of a basic unit operation table the analysis result database 12 of the event analysis system 1 stores according to the first embodiment of the present invention. As shown in FIG. 3, the basic unit operation table is a table format which may include a column of seven data items such as a "basic unit operation ID", a "starting date and time", an "ending date and time", a "tag name", an "operation type", an "operation method", and an "event ID". Each line included in the basic unit operation table is respectively one event log data.

In the item of the basic unit operation ID, a value representing the identifier for uniquely identifying each unit of the basic unit operation is stored. In the item of the starting date and time, a value representing the starting date and time which each sequential of the basic unit operation is stored. The starting date and time is the date and time which the firstly generated event log among the event log included in the basic unit operations is generated. In the item of the ending date and time, the value representing the ending date and time of each unit of the basic unit operation is stored. The ending date and time is the ending date and time which the last event log data among the event log data included in the unit of the basic unit operation is generated.

In the item of the tag name, in the cast that a plurality of the control system 14 exists, a value representing the device identifier (tag) for uniquely identifying the control system 14 that generated the event log data is stored. In the item of the operation type, a value representing an identifier representing the operation type that the DCS operator performed is stored. In the item of the operation method, a value representing the operation method which the DCS operator performed is stored. In the item of the event ID, a value representing the event ID of each event log included in the basic unit operation is stored. Incidentally, the format of the basic unit operation table described above is not limited to the form described above.

For example, the first basic unit operation data (i.e., the basic unit operation data of which the basic unit operation ID is No. 1) shown in FIG. 3 represents that the DCS operator changes an operating mode of the "TAG1" device from "AUT" to "MAN" at "Aug. 21, 2015 at 10:00:00". Subsequently, the second basic unit operation data (i.e., the basic unit operation of which the base unit operation ID is a "No. 2") shown in FIG. 3, represents that the DCS operator performed ramping the setting value of the "MV (operation amount)" of the "TAG1" device, from "Aug. 21, 2015 at 10:00:10" to "Aug. 21, 2015 at 10:01:00". Since the value of the "operation method" is the "ramping +", the basic unit operation represents that the DCS operator performed ramping operation to make the setting value increasing.

Returning to FIG. 1 again, the configuration of the event processor according to the first embodiment will be described below. The unit operation analyzer 1032 estimates the operation intention representing what a change the DCS operator gives to the process by using the information of the basic unit operation analyzed by the basic unit operations analyzer 1031 on the basis of the rule which is based on domain knowledge (which is referred to as experienced knowledge of a skilled DCS operator, location-specific and a device-specific knowledge, an industry-specific knowledge, etc.), and thereby the unit operation analyzer 1032 extracts the unit operation. The unit operation represents the operation intention performed by the DCS operator. The unit operation analyzer 1032 records the data representing the extracted unit operation (hereinafter, referred to as a unit operation data) to the unit operation table stored in the analysis result database 12.

Unit operations analyzer 1032 acquires, for example, the information representing that the basic unit operations analyzer 3031 recorded the basic unit operation data to the base unit operation table from the basic unit operation analyzer 3031. The unit operation analyzer 1032 implements the extraction process and the recording process of the unit operations described above at the timing of acquiring the information.

An example of the unit operation table stored in the analysis result database 12 and the unit operation data recorded in the unit operation table will be described with reference to FIG. 4. FIG. 4 is a diagram showing an example of the unit operation table the analysis result database 12 of the event analysis system 1 stores according to an embodiment of the present invention. As shown in the FIG. 4, the unit operation table is a table format which may include a column of six data items such as an "unit operation ID", a "starting date and time", an "ending date and time", a "tag name", an "operation intention", and a "basic unit operation ID". Each line included in the unit operation table is respectively one unit operation data. The unit operations data may be a data arranged in time series generated in a sequential of the event or a unit of the event.

In the item of the "unit operation ID", a value representing the identifier for uniquely identifying each unit operation is stored. In the item of "starting date and time", a value representing the starting date and time of each unit operation is stored. The starting date and time is the date and time of starting the basic unit operations that are performed firstly among the basic unit operations included in the unit operation. In the item of the "ending date and time", a value representing the ending date and time of each unit operation is stored. The ending date and time is the date and time of ending the basic unit operations that are performed lastly among the basic unit operation included in the unit operations.

In the item of the "tag name", in the case that a plurality of the control system 14 exists, a value representing the device identifier (tag) for uniquely identifying the control system 14 that generated the event log data is stored. In the item of the "operation intention", a value representing the operation intention which the DCS operator performed is stored. In the item of the "basic unit operation ID", a value representing the basic unit operations ID in each the basic unit operation included in the unit operation is stored. Incidentally, the format of the unit operation table described above is not limited to the form described above.

For example, the first unit operation data (i.e., the unit operation data of which the unit operation ID is "No. 1") shown in FIG. 4, represents that the DCS operator performed operation intended "increasing the flow amount" of the "TAG1" device, "Aug. 21, 2015 at 10:00:10" to "Aug. 21, 2015 at 10:03:01". Subsequently, the second unit operation data (i.e., the unit operation data of which the unit operation ID is "No. 2") shown in FIG. 4, represents that the DCS operator performed operation intended "fine-tuning of the temperature" of the "TAG1" device, "Aug. 21, 2015 at 10:00:50" to "Aug. 21, 2015 at 10:02:50".

Returning to FIG. 1 again, the configuration of the event processor according to the first embodiment will be described below. The analysis result output unit 104 has a function to display visually the analysis results represented the basic unit operation group and the unit operation group which the event analyzer 103 extracted on the time axis on the display 13. The analysis result output unit 104 visualizes data (i.e., the basic unit operation data, and the unit operation data) representing the analysis results analyzed by an event analyzer 103 by converting to the list form and the graphical form having time axis corresponding to the user request. Thereby, the analysis result output unit 104 makes the visualized analysis result data displaying on the display 13.

The display 13 includes, for example, a liquid crystal display or an organic EL (Erectro Luminescence) display. The output method of the analysis result data which the analysis result output unit 104 visualized is not limited to the output method to be displayed by the display 13. For example, the output method of the visualized analysis result data may be the output method according to be printed by the printer apparatus (not shown), may be the output method to be outputted as electronic data. Further, the analysis result output unit 104 can announce a method of the operation which the DCS operator has adopted in the event read from the analysis result data or a procedure of the performance that was performed by the DCS operator in a way that can be understood in an auditory manner such as audio.

Figure 5:
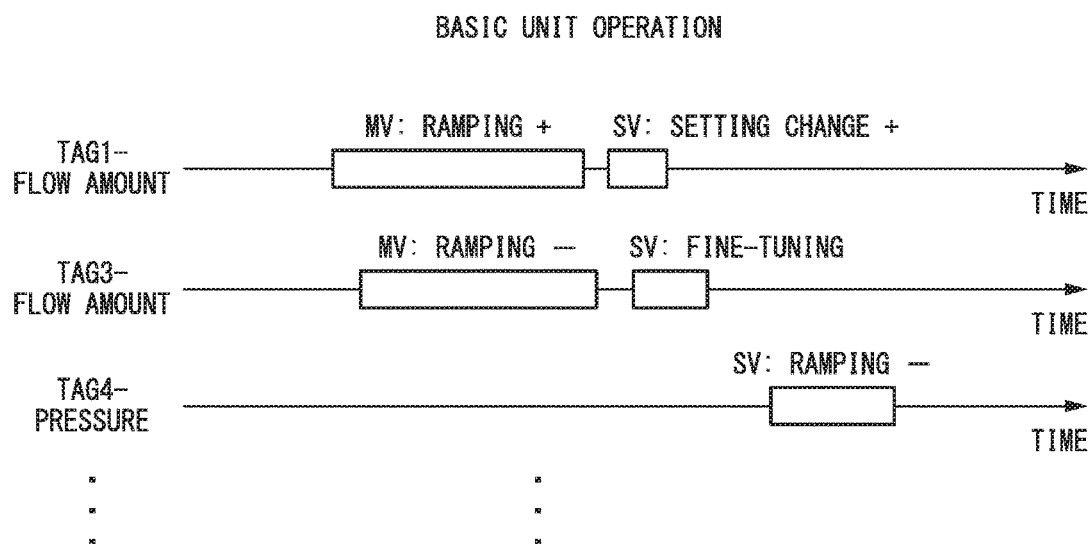
FIG. 5 is a diagram showing an example of the analysis result of the basic unit operation the analysis result output unit of the event analyzer outputs according to the first embodiment of the present invention.

An example of the analysis result data which the analysis result output unit 104 visualized will be described with reference to FIG. 5 and FIG. 6. FIG. 5 is a diagram showing an example of the analysis result of the basic unit operation the analysis result output unit 104 of the event analyzer 10 outputs according to the first embodiment of the present invention. As shown in the diagram, each the basic unit operation is displayed along the horizontal axis representing the time axis for each device (i.e., tag name). Accordingly, the information representing the time and the operating method which the basic unit operation performed are visualized.

In the example of FIG. 5, the device of which the tag name is "TAG1" represents that the DCS operator firstly performs operation of ramping ("ramping +") to increase the "MV (operation amount)", subsequently, the DCS operator performed operation ("setting changing +") to be setting change to increase the "SV (target value). Further, in the example of FIG. 5, the device of which the tag name is "TAG3" represents that the DCS operator firstly performs operation of ramping ("ramping –") to decrease the "MV (manipulated variable)", subsequently, the DCS operator performed operation of the "fine-tuning" of the "SV (target value)". Furthermore, in the example of FIG. 5, the device of which the tag name is "TAG3" represents that the DCS operator firstly performs operation of ramping ("ramping –") to decrease the "MV (manipulated variable)". Then, the device of which the tag name is "TAG4" represents that the time the DCS operator performed the basic unit operation is later than the time the DCS operator performed the basic unit operations in the device of which the tag name is "TAG1" and the device of which the tag name is "TAG3".

Figure 6:
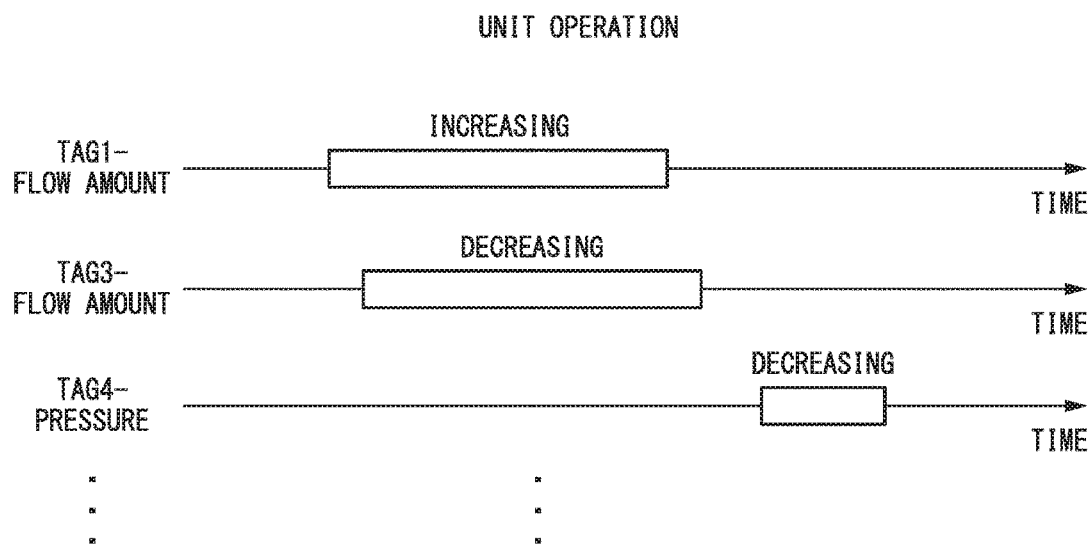
FIG. 6 is a diagram showing an example of the analysis result of the unit operation the analysis result output unit of the event analyzer outputs according to the first embodiment of the present invention.

FIG. 6 is a diagram showing an example of the analysis result of the unit operation the analysis result output unit 104 of the event analyzer 10 outputs according to the first embodiment of the present invention. As shown in FIG. 6, each unit operation is displayed along the horizontal axis representing the time axis for each device (i.e., tag name), and the information representing the time performed the unit operation and the operation intention is visualized.

In the example of FIG. 6, the performance of which the DCS operator performed the operation with the intention of increasing the "flow amount" is represented in the device of which the tag name is "TAG1".

Further, in the example of FIG. 6, the performance of which the DCS operator performed the operation with the intention of decreasing the "flow amount" is represented in the device of which the tag name is "TAG3".

Furthermore, in the example of FIG. 6, the performance of which the DCS operator performed the operation with the intention of decreasing the "pressure" is represented in the device of which the tag name is "TAG4".

And then, the time at which the unit operation performed in the device of which the tag name is "TAG4", is later than the time at which the unit operation performed in the device of which the tag name is "TAG1" and "TAG3", is represented in the device of which the tag name is "TAG4".

(Behavior of the Event Analyzer)

Figure 7:
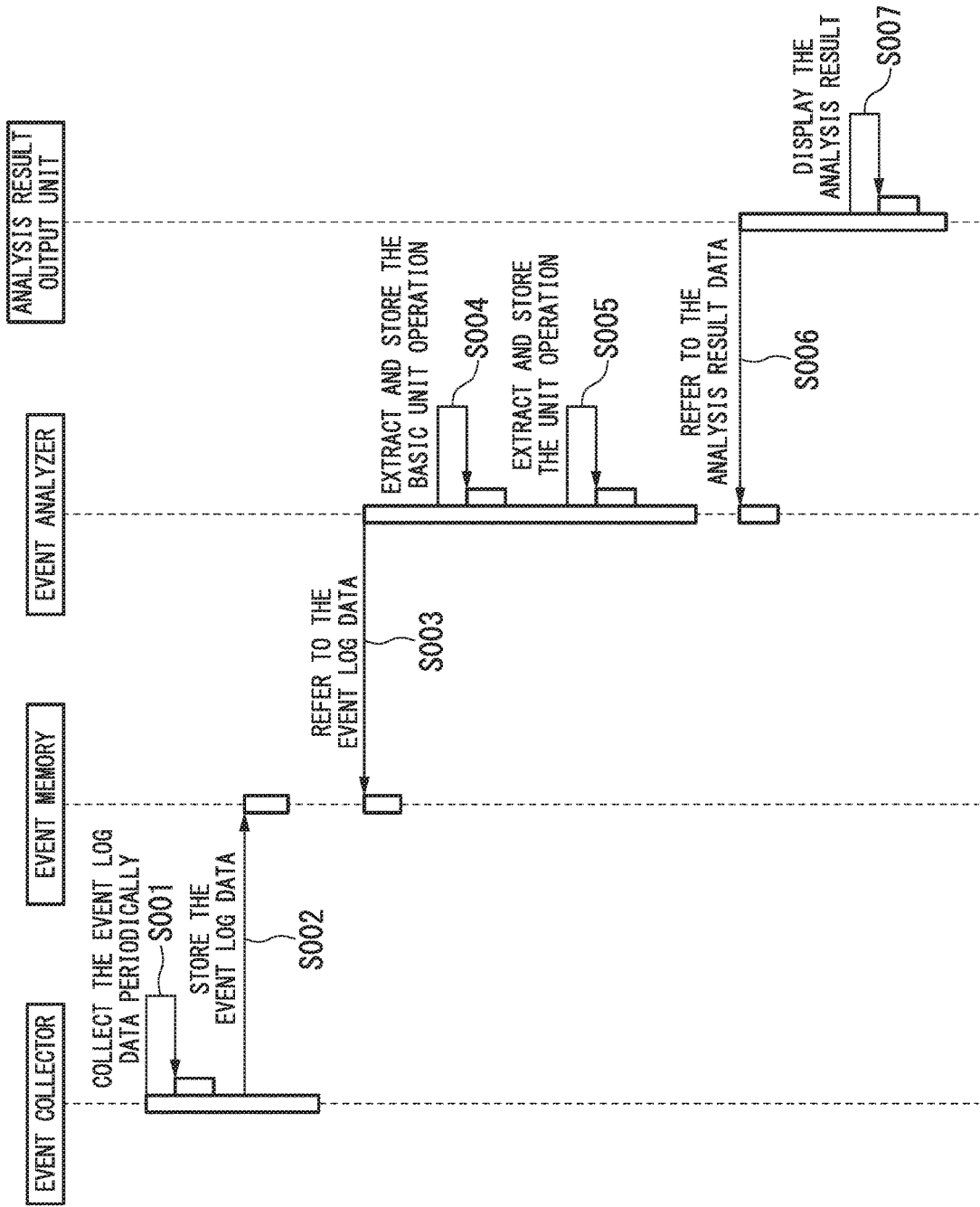
FIG. 7 is a sequence diagram showing an operation of the event analyzer according to the first embodiment of the present invention.

The behavior of the event analyzer according to the first embodiment will be described with reference to the drawings bellow. FIG. 7 is a sequence diagram showing an operation of the event analyzer 10 according to the first embodiment of the present invention.

(Step S001): The event collector 101 collects the event log data periodically from the control system 14 and the historian 15.

(Step S002): The event memory 102 stores the event log data which the event collector 101 collected, in the event log database 11 in the form of event log data shown in FIG. 2.

(Step S003): The event analyzer 103 refers to the event log data periodically or in response to the user's request.

(Step S004): The basic unit operation analyzer 1031 configured in the event analyzer 103 extracts the basic unit operation data from the event log data, and then, stores the basic unit operation data to the analysis result database 12.

(Step S005): The unit operation analyzer 1032 configured in the event analyzer 103 extracts the unit operation data from the basic unit operation data, and then, stores the unit operation data to the analysis result database 12.

(Step S006): The analysis result output unit 104 refers to the analysis result data analyzed by the event analyzer 103 (i.e., the basic unit operation data and the unit operation data) in response to a user's request.

(Step S007): The analysis result output unit 104 displays the analysis result based on the analysis result data required from the event analyzer 103 on the display 13.

Next, the extraction of the basic unit operation data and the unit operation data according to the embodiment of the present invention will be described. As described above, the event analyzer 10 according to the first embodiment extracts the operation in two phases (i.e., the extraction of the basic unit operation data and the extraction of the unit operation data).

(Operation of the Process of Extracting of the Basic Unit Operation Data)

Figure 8:
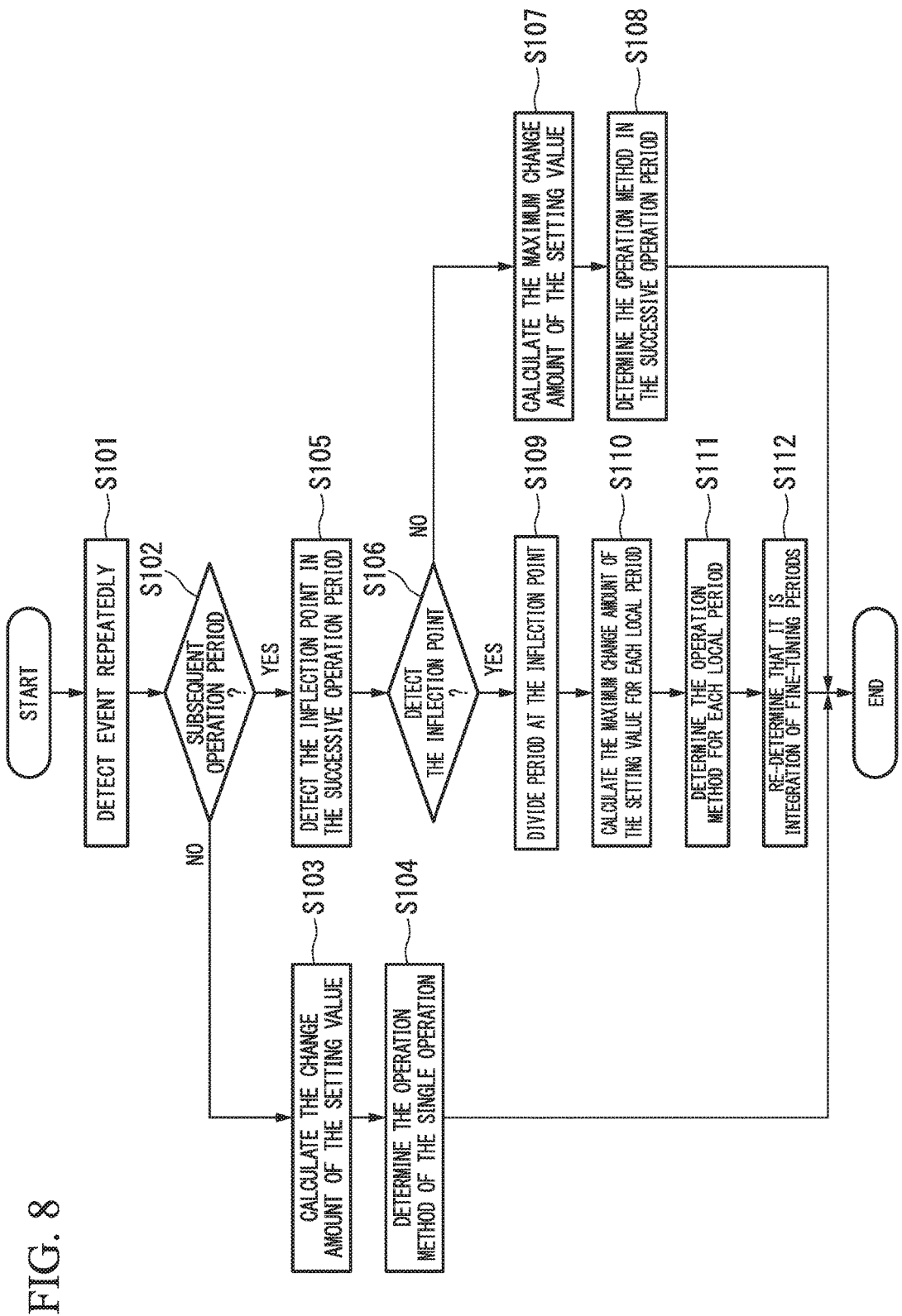
FIG. 8 is a flowchart showing the extracts processing of the basic unit operation by the basic unit operation analyzer included in the event analyzer according to the first embodiment of the present invention.

In the first stage, the event analyzer 10 extracts the basic unit operation data. The event analyzer 10 analyzes the operating method based on the operation event data in order to extract the basic unit operation data. The operation of extraction processing of the base unit operation of the event analyzer according to the first embodiment will be described with reference to the drawings below. FIG. 8 is a flowchart showing the extracts processing of the basic unit operation by the basic unit operation analyzer 1031 included in the event analyzer 10 according to the first embodiment of the present invention.

In the present embodiment, though the embodiment that the event analyzer 10 changes the SV value (target value) and the MV value (operation amount) will be described, the present invention is not limited to this embodiment. For example, the event analyzer 10 may change a threshold of the alarm, and analyze a changing operation of the control variables, such as P values (Proportional control) in the PID control, I values (Integral control), and D values (Derivative control).

(Step S101): The event collector 101 collects the event log data periodically from the control system 14 and the historian 15. Then, the process proceeds to step S102.

(Step S102): The DCS operator may gradually change the setting value such as ramping. In the case, the DCS operator may perform the operation based on the identical operation intention in plural times. Therefore, firstly the specific event will be split for every successive event. In this case, if the event log groups representing the setting value changing of the identical type meet the following three conditions, the event log groups will be detected as the continuous operation section.

1) The alarm interval of the event is within ΔT.
2) The event for switching to a different operation mode (e.g., "MAN", "AUT") is not presented.

3) The changed setting value in the prior operation event is equal to the set value before changing in the following events.

If the event log group is not detected as a successive operation period, the process proceeds to step S103. If the event log group is detected as a successive operation period, the process proceeds to step S111.

(Step S103): If the event log group is not detected as a successive operation section, the basic unit operation analyzer 1031 recognizes that the event log group is performed alone or a single step operation is performed without accompanying any other prior or subsequent operations. In the case of a single operation, the basic unit operations analyzer 1031 calculates the change amount of the setting value based on the difference between the setting value after changing and the setting value before changing (absolute value). Then, the process proceeds to step S104.

(Step S104): The basic unit operation analyzer 1031 determines the operation method of the single operation based on the change amount of the setting value. If the change amount of the setting value is more than a threshold value, the basic unit operations analyzer 1031 determines that the setting change is made. If the change amount is positive, the basic unit operation analyzer 1031 sets the change amount to the "setting change +". If the change amount is negative, the basic unit operation analyzer 1031 sets the change amount to the "setting change −". If the change amount of the setting value is less than the threshold value, the basic unit operation analyzer 1031 determines that the setting value change is the fine-tuning. Since the fine-tuning is the operation for stabilizing the current state, the basic unit operation analyzer 1031 does not perform the distinction between positive and negative. Thus, the processing of this flowchart is terminated.

(Step S105): If the event log group is detected as a successive operation period, the basic unit operation analyzer 1031 determines the operation method using the following method for the successive operation period. The basic unit operations analyzer 1031 analyzes the transition (trend) of the setting value in the event log group in successive operation period. The basic unit operation analyzer 1031 detects the presence or absence of the inflection point based on the transition of the setting value. Afterward, the process proceeds to step S106. Then, the inflection point means the point where a changing direction of the setting value changes from increase to decrease or the point where a changing direction of the setting value changes from decrease to increase.

(Step S106): If the inflection point of the setting value does not exist in the successive operation period, the process proceeds to step S107. If the inflection point of the setting value exists in the successive operation period, the process proceeds to step S109.

(Step S107): That the inflection point of the successive setting values do not exist represents that the operation direction of the operation event in the successive operation period is constant. The basic unit operation analyzer 1031 detects the operation direction of the operation event using the change amount which is the difference between the first point and the last point in the successive operation period. Otherwise, the basic unit operation analyzer 1031 may perform a regression analysis, and may detect the operation direction of the operation event using the inclination of the regression line of the setting value. Then, the process proceeds to step S108.

(Step S108): If the change amount or the inclination of the regression line of the setting value is positive and the value thereof is larger than the threshold value, the basic unit operation analyzer 1031 determines that the ramping operation is the "ramping +". Further, if the change amount or the inclination of the regression line of the setting value is negative, the basic unit operation analyzer 1031 firstly performs sign inversion on the value. Then, if the sign inverted value is larger than the threshold value, the basic unit operation analyzer 1031 determines that the ramping operation is the "ramping −". In the other case described above, the basic unit operation analyzer 1031 determines the ramping operation is the "fine-tuning". Thus, the processing of this flowchart is terminated.

(Step S109): If one or more inflection points exist in a successive operation period, the basic unit operation analyzer 1031 divides one successive operation period into a plurality of local period as the inflection point is the partition so that the operation direction of the operation event in the one period becomes constant. Thereafter, the process proceeds to step S110.

(Step S110): the basic unit operation analyzer 1031 calculates the maximum change amount of the setting value for each local period, same as in the case where no inflection point exists in the successive operation period as described above. Then, the process proceeds to step S111.

(Step S111): The basic unit operation analyzer 1031 determines the operation method of the event log groups for each local period based on the maximum change amount of the setting value. Then, the process proceeds to step S112.

(Step S112): if the local periods being determined the fine-tuning are contiguous, the basic unit operations analyzer 1031 integrates these local periods to re-determine the operation method. The basic unit operation analyzer 1031 performs the regression analysis in the integrated periods, then if the inclination of the regression line of the setting value is equal to or larger than the threshold value, the basic unit operation analyzer 1031 determines that the ramping operation is the "ramping +". Similarly, if the inclination of the regression line of the setting value is negative, and the inclination is larger than a threshold value, the basic unit operation analyzer 1031 determines "ramping −". In the other case described above, the basic unit operation analyzer 1031 determines that the ramping operation is the "fine-tuning". Thus, the processing of this flowchart is terminated.

(Extraction Example of the Basic Unit Operation)

Figure 9:
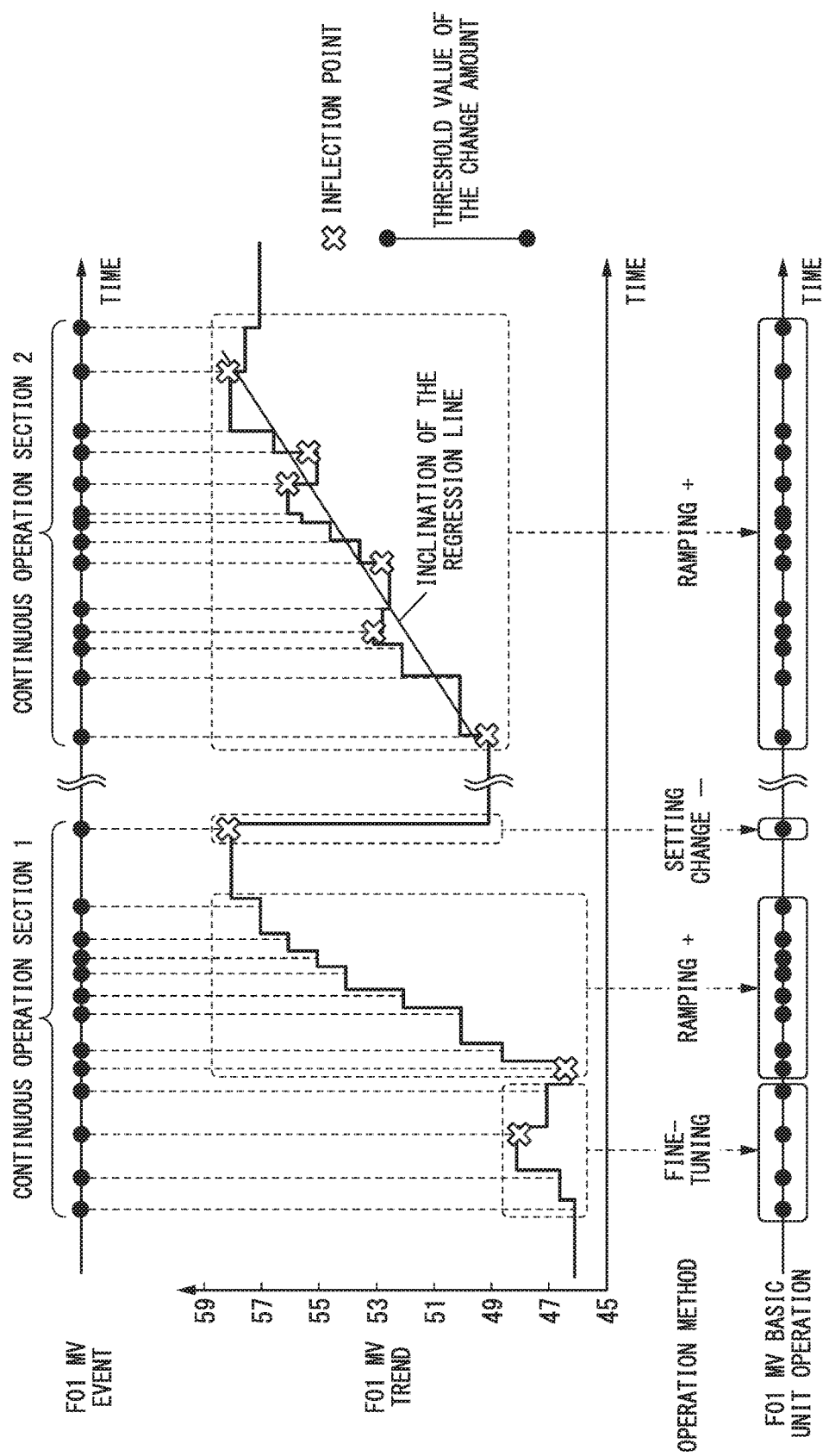
FIG. 9 is a schematic diagram showing an example of an extract processing of the basic unit operation by the basic unit operation analyzer of the event analyzer according to the first embodiment of the present invention.

Hereinafter, an example of the extraction processing of the basic unit operation by the basic unit operation analyzer 1031 will be described with reference to the drawings. FIG. 9 is a schematic diagram showing an example of an extract processing of the basic unit operation by the basic unit operation analyzer 1031 of the event analyzer 10 according to the first embodiment of the present invention.

In the example of FIG. 9, the device of which the tag name is "F01" represents that the basic unit operation analyzer 1031 detects the successive operation period 1 and the successive operation period 2 regarding the event log group in order to change the setting value of the "MV (manipulated variable)". Further, in the example of FIG. 9, the device of which the tag name is "TAG3" represents that the basic unit operation analyzer 1031, subsequently, detects the inflection point in the successive operation period 1 and the successive operation period 2, to determine the basic unit operation for the successive operation period. In addition, FIG. 9 shows that the basic unit operation analyzer 1031 determined the operation method of operation, to extract the basic unit operation groups such as the "fine tuning" operation to the "MV" of the "F01", the "ramping +" operation, the "setting change −" operation, and the "ramping +" operation.

(Operation of the Extraction Processing of the Unit Operation)

The event analyzer 103, as a first phase, after extraction of the basic unit operation group described above, then, as a second phase, extracts the unit operation group. As described above, though the basic unit operation is the one operation, the DCS operator may achieve the objection by combining a plurality of operation methods according to the situation to change the process. For example, as an example, in order to increase the flow amount, the DCS operator may widely open the valve at once (MV: setting change +), to close the valve little by little (MV: ramping −).

In addition, the DCS operator may achieve one object by changing multiple types of the setting value. For example, as an example, in a case that the DCS operator manually intervenes to an automatic control loop, the DCS operator switches the mode of the regulator to the MAN, to increase the value of the "MV" by ramping, to return the mode to the AUT, and to re-set the value of the "SV".

Accordingly, the unit operation analyzer 1032 according to the present embodiment, firstly gathers the basic unit operation groups performed with the same operation intention. The process for gathering the basic unit operations is performed based on the determination result whether the basic unit operation is performed with the same operation intention in accordance with the rules set on the basis of the domain knowledge. For example, in a plurality of the basic unit operation of the identical "tag name" and the identical "operation type", if the following conditions are met, the unit operation analyzer 1032 determines that the basic unit operations are performed with the same intention.

[Prerequisite 1]: "an operation interval<$\Delta t1$".
[Prerequisite 2]: any of the four conditions shown below is satisfied.

The basic unit operation has the same directivity (+ or −).
The basic unit operations performed the fine-tuning and the arbitrary basic unit operation are combined.
The operation of the positive direction and the negative direction meets "the operation period<$\Delta t2$".

It should be noted that the operation period means a period from the starting time of the previous operation to the ending time of the next operation.

The operation of the positive direction and the operation of the negative direction meet "amplitude ratio<threshold.

In addition, in a case that the "tag name" of the SV value is same as the "tag name" of the MV value, the "operation type" of the SV value is different from the "operation type" of the MV value, and the basic unit operation regarding the SV value and the MV value meets the above condition, the unit operation analyzer 1032 determines that the basic unit operations are performed with the same operation intention. Next, the unit operation analyzer 1032 estimates the operation intention of the basic unit operation group having the same tag determined the same operation intention. The unit operations analyzer 1032 estimates the operation intention based on the directivity of operation group being determined the same operation intention.

(Example of Extraction of the Unit Operation)

Figure 10:
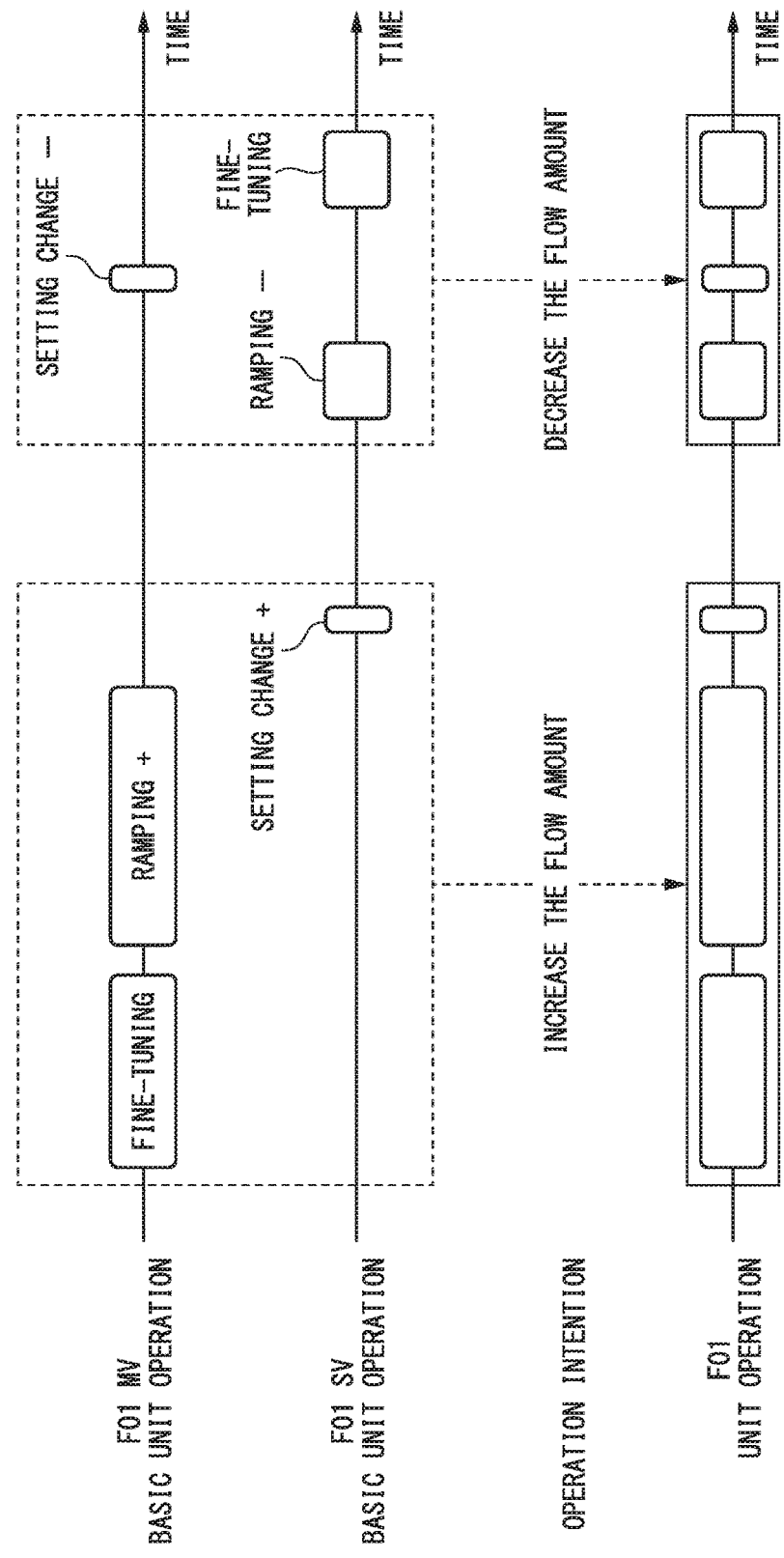
FIG. 10 is a schematic diagram showing an example of an extraction processing of the unit operation by the unit operation analyzer in the event analyzer according to the first embodiment of the present invention.

Hereinafter, an example of extraction processing of the unit operation according to the unit operation analyzer 1032 will be described with reference to the drawings. FIG. 10 is a schematic diagram showing the example of the extraction processing of the unit operation by the unit operation analyzer 1032 in the event analyzer 10 according to the first embodiment of the present invention.

As shown in the figure, the upper part of FIG. 10, illustrates a state of being extracted the basic unit operation by the analyzer 1031, and being displayed the basic unit operation along the time axis, regarding to the basic unit operation to the "MV (operation amount)" and the basic unit operation to the "SV (target value)" of the device of which the tag name "F01" The lower part of FIG. 10 represents the state that the unit operation analyzer 1032 analyzed that the "fine-tuning" operation of the "MV", the "ramping +" operation of the "MV", and the "setting change +" operation of the "SV" shown in the upper part of FIG. 10, was performed with the operation intention to "increase the flow amount" of the device.

The lower part of FIG. 10 represents the state that the unit operation analyzer 1032 analyzed that the "ramping −" operation of the "SV", the "setting change −" operation of the "MV", and the "fine-tuning" operation of the "SV" shown in the upper part of FIG. 10, was performed with the operation intention to "increase the flow amount" of the device. Thus, as shown in FIG. 10, the unit operation analyzer 1032 extracts the unit operation having the operation intention to the "increase" of the flow amount in the device of which the tag name is the "F01", and the unit operation having the operation intention to the "decrease" of the flow amount in the device of which the tag name is the "F01".

As described above, the event analyzer 10 according to the first embodiment can collect and analyze the event log groups of the event log data that are scattered in the control system 14 and the historian 15, raise the operation abstraction to the level of recognizing the operation method and operation intention of the DCS operator. Thus, for example, in the case that the user refers to the past operation history, the user of the event analyzer 10 can understand the purpose and content of the operation of the DCS operator more easily. Further, the user can grasp the know-how of the DCS operator more easily. In addition, the user can grasp the whole picture of the flow of the DCS operators operation more easily.

Second Embodiment

Figure 11:
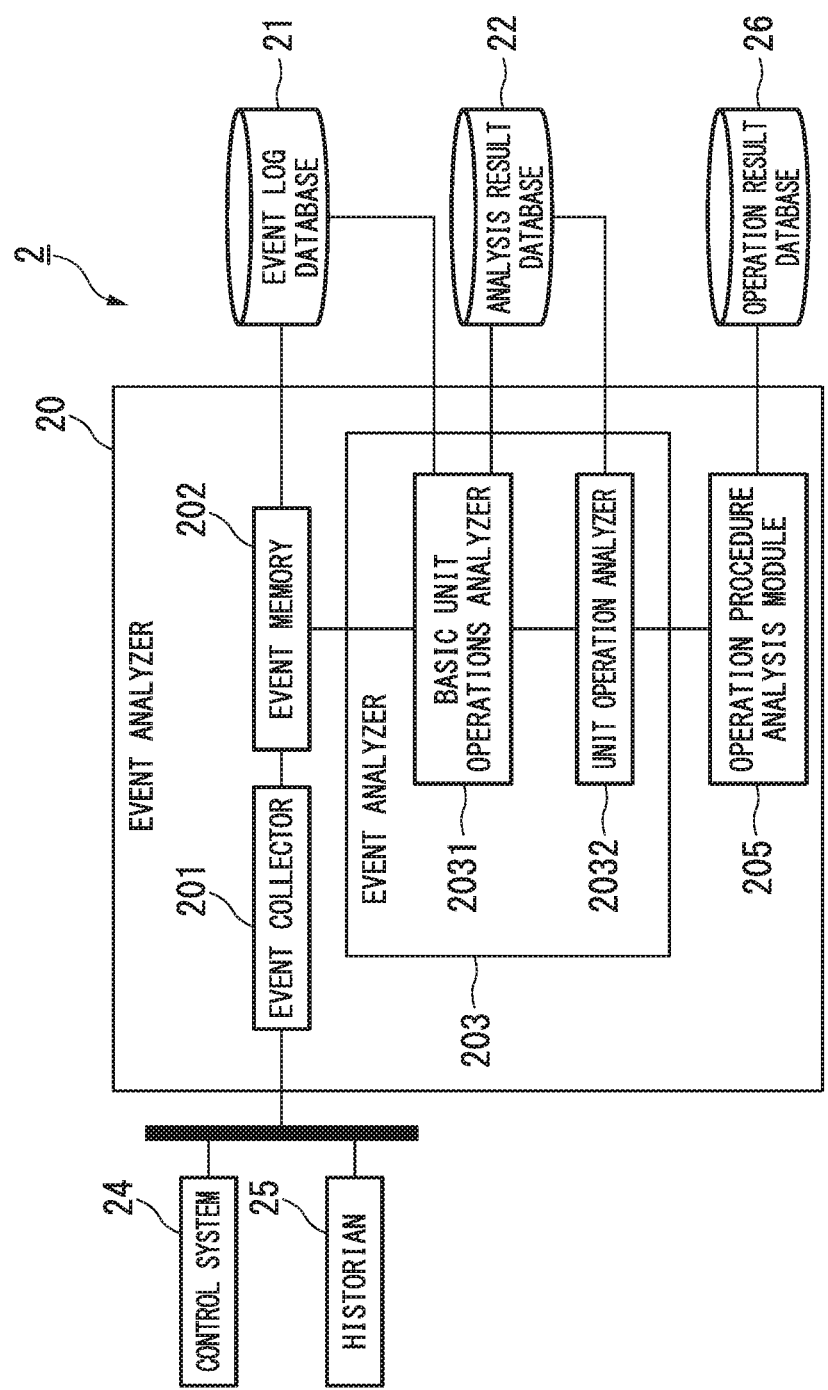
FIG. 11 is a block diagram showing a functional configuration of an event analysis system and event analyzer according to a second embodiment of the present invention.
Figure 12:
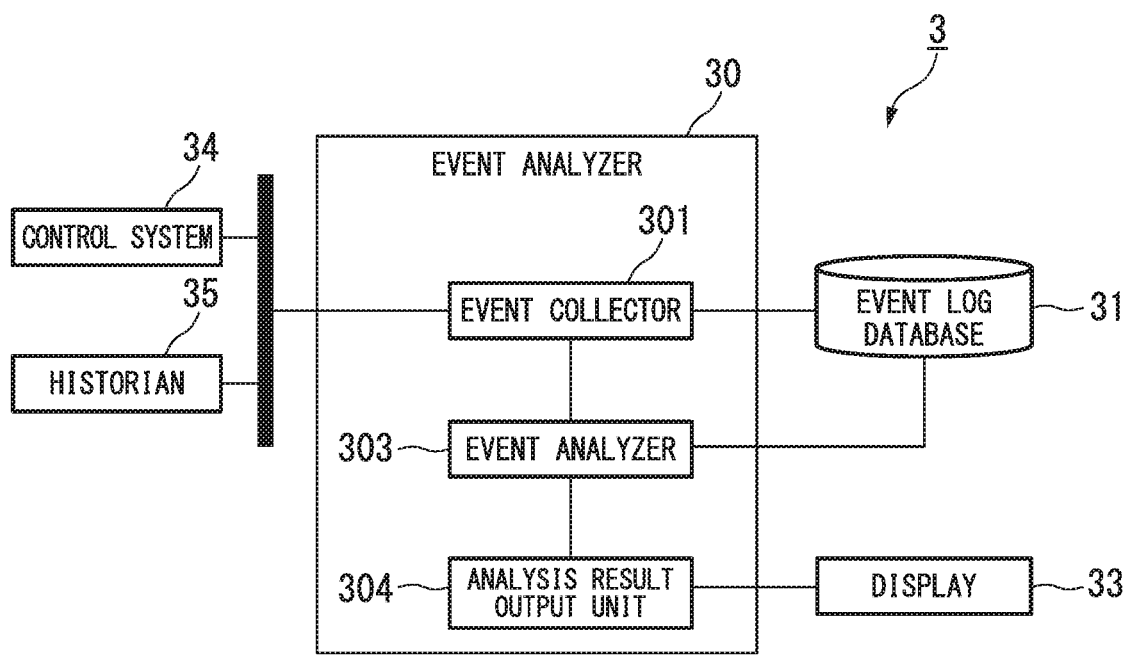
FIG. 12 is a block diagram showing the functional configuration of a prior event analysis system and an event analyzer.

Hereinafter, a second embodiment of the present invention will be described with reference to the drawings. FIG. 11 is a block diagram showing a functional configuration of an event analysis system and event analyzer according to the second embodiment of the present invention.

As shown in FIG. 11, the event analyzer 20 according to the second embodiment includes an operation procedure analysis module 205, in addition to the configuration of the event analyzer according to the first embodiment. The event analyzer 20 according to the second embodiment includes an operation procedure analysis module 205. The event analyzer according to the second embodiment includes the basic configuration of the event analyzer according to the first embodiment. The event analyzer according to the second embodiment may include all configurations, functions, effects of the event analyzer according to the first embodiment. The operation procedure analysis module 205 analyzes the extracted sequences (parallel/serial) of each of the unit operations and the base unit operation. Then, the DCS operator extracts the operation procedure for performing the alarm response and steady operations. The event analyzer 20 may include a speaker which announces audibly operation procedures extracted by the operation procedure analysis module 205.

Thus, the user of the event analyzer 20 can grasp the overall flow of the operations the DCS operator performs by referring to the operation procedure configured of the unit operations. Further, the user of the event analyzer 20 can read the detailed operation know-how when the DCS operator performs the operation by referring to the operation procedure configured of the basic unit operations.

The user of the event analyzer 20 can compare the actual conditions of the operation by the DCS operator and the operation represented in the existing standard operation manual, according to utilize the above-noted operation procedures actually performed in the past. Thus, the user of the event analyzer 20 can improve the standard operation manual, and the operation may further be leaded to be automatically.

In addition, the event analyzer 20 stores the events (such as the alarm) associated with the past operation procedures in the event memory. The user of the event analyzer 20 compares the currently performed operation or the occurred alarm and the operation procedure data stored in the past. Thus, the user can search the operation procedure similar to the alarm which currently performed operation or the occurred alarm from the database. Further, the event analyzer 20 may be useful to support the online operation.

Although the embodiments of the present invention have been described above, there is no restriction to the above-noted embodiment, and appropriate changes can be made within the scope of spirit of the invention.

Incidentally, it is also possible to realize a part or all of the event analyzer 10 and the event analyzer 20 according to the embodiment described above in a computer. In that case, the program for realizing the control function may be recorded on a computer-readable recording medium, and may be realized by installing the program recorded in this recording medium into a computer system, and executing the program. Further, the computer system may read and execute the program recorded in the cloud.

The "computer system" may be a computer system incorporated in the event analyzer 10 and the event analyzer 20, and may include an OS and a hardware such as peripheral devices. In addition, the "computer-readable recording medium" refers to a flexible disk, a magneto-optical disk, a ROM, a portable medium such as a CD-ROM, and a memory such as a hard disk incorporated in the computer system.

Even more, the "computer-readable recording medium" may include a medium which holds the program dynamically and in short time, such as a communication line used in the case of transmitting program via a communication line such as a network or a telephone line such as the Internet. Further, the "computer-readable recording medium" may include a medium which holds the program in predetermined time such as a volatile memory inside the computer system serving as a server or a client. Furthermore, implement a part of the above functions. Moreover, the program may implement the above described functions in combination with previously recorded program in a computer system.

The event analyzer 10 and the event analyzer 20 in the embodiment described above may be realized as an integrated circuit such as the LSI (Large Scale Integration). Each functional block of the event analyzer 10 and the event analyzer 20 may individually be a processor. Each functional block of the event analyzer 10 and the event analyzer 20 may be a processor by being integrated part or whole thereof.

In addition, the method of circuit integration may be realized by a dedicated circuit or a general-purpose processor, not limited to the LSI. Further, if the integrated circuit technology replacing the LSI had appeared by advancing the semiconductor technology, the integrated circuit according to the technology may be used.

What is claimed is:

1. An event analyzer for a distributed control system (DCS) that controls operations in a plant comprising:
   at least one memory storing instructions, and
   at least one processor configured to execute the instructions to:
   collect event log data representing an operation history of operations performed by the DCS operator;
   analyze the event log data, and extract basic unit operation data representing an operation method based on the operations performed by the DCS operator; and
   analyze basic unit operation data, and extract unit operation data representing operational intentions of the operations by the DCS operator,
   wherein the at least one processor is configured to execute the instructions to:
   detect, based on the event log data, a successive operation period in which operations for changing a setting value of the identical type for a single control system are performed continuously in time;
   analyze a trend representing transition of the setting value in the successive operation period;
   determine the operation method based on a change amount of the setting value, and thereby extract the basic unit operation data;
   analyze the trend to detect presence or absence of an inflection point representing a point where a changing direction of the setting value changes from increase to decrease or a point where a changing direction of the setting value changes from decrease to increase;
   divide the successive operation period into a plurality of local periods as the inflection point is the partition in a case in which the inflection point exists in the successive operation period;
   determine the operation method based on the change amount which is difference between a first point and a last point in each local period;
   determine that the operation method is a ramping operation for increase in a case in which the change amount is positive and is larger than a threshold value;
   perform sign inversion on the change amount in a case in which the change amount is negative, and determine that the operation method is a ramping operation for decrease in a case in which the sign inverted change amount is larger than a threshold value; and
   determine that the operation method is fine-tuning in a case in which the operation method is not determined as the ramping operation for increase or the ramping operation for decrease.

2. The event analyzer according to claim 1, wherein
   the at least one processor is configured to execute the instructions to:
   collect a plurality of event log data arranged in time series;
   extract one or more of basic unit operation data and analyze one or more of the event log data; and
   analyze basic unit operation data extracted and extract unit operation data representing intention of the operation by the DCS operator.

3. The event analyzer according to claim 1, wherein
the at least one processor is configured to execute the instructions to:
determine the operation intention which means what kind of change the DCS operator gives to the process, and extract unit operation data based on rule which is based on domain knowledge.

4. The event analyzer according to claim 2, wherein
the at least one processor is configured to execute the instructions to:
determine the operation intention which means what kind of change the DCS operator gives to the process, and extract unit operation data based on rule which is based on domain knowledge.

5. The event analyzer according to claim 1, wherein
the at least one processor is configured to execute the instructions to:
output analysis result data representing the basic unit operation or the unit operation on time axis based on the basic unit operation data or the unit operation data.

6. The event analyzer according to claim 2, wherein
the at least one processor is configured to execute the instructions to:
output analysis result data representing the basic unit operation or the unit operation on time axis based on the basic unit operation data or the unit operation data.

7. The event analyzer according to claim 1, wherein
the at least one processor is configured to execute the instructions to:
output analysis result data representing the basic unit operation or the unit operation on time axis based on basic unit operation data or unit operation data, and
the event analyzer further comprises:
a display configured to display in a visual manner analysis data outputted.

8. The event analyzer according to claim 2, wherein
the at least one processor is configured to execute the instructions to:
output analysis result data representing the basic unit operation or the unit operation on time axis based on basic unit operation data or unit operation data, and
the event analyzer further comprises:
a display configured to display in a visual manner analysis data outputted.

9. The event analyzer according to claim 1, wherein
the at least one processor is configured to execute the instructions to:
analyze sequences of basic unit operation data or unit operation data, and extract an operation procedure for which the DCS operator performs an alarm response and a steady operation.

10. The event analyzer according to claim 1, wherein
the at least one processor is configured to execute the instructions to:
analyze sequences of basic unit operation data or unit operation data, and extract an operation procedure for which the DCS operator performs an alarm response and a steady operation, and
the event analyzer further comprises:
a speaker configured to announce in an auditory manner the operation procedure extracted.

11. An event analyzer according to claim 1, wherein
the at least one processor is configured to execute the instructions to:
output event log data indicating operation history which the DCS operator performed.

12. The event analyzer according to claim 1, wherein
the at least one processor is configured to execute the instructions to:
determine the operation method based on the change amount which is difference between a first point and a last point in the successive operation period in a case in which the inflection point does not exist in the successive operation period.

13. The event analyzer according to claim 1, wherein
the at least one processor is configured to execute the instructions to:
integrate the local periods in a case in which the local periods determined the fine-tuning are contiguous, and perform regression analysis in the integrated periods;
determine that the operation method is a ramping operation for increase in a case in which inclination of a regression line is equal to or larger than a threshold value;
determine that the operation method is a ramping operation for decrease in a case in which the inclination of the regression line is negative and is larger than a threshold value; and
determine that the operation method is fine-tuning in a case in which the operation method is not determined as the ramping operation for increase or the ramping operation for decrease.

14. An event analysis method for a distributed control system (DCS) that controls operations in a plant using a computer comprising:
collecting event log data representing operation history which the DCS operator performed;
analyzing event log data collected in the step of collecting the event and extracting basic unit operation data representing an operation method operated by the DCS operator; and
analyzing basic unit operation data and extracting unit operation data representing operation intention of the operation by the DCS operator,
wherein analyzing the event log data comprises:
detecting, based on the event log data, a successive operation period in which operations for changing a setting value of the identical type for a single control system are performed continuously in time; and
analyzing a trend representing transition of the setting value in the successive operation period;
wherein extracting the basic unit operation data comprises:
determining the operation method based on a change amount of the setting value, and thereby extracting the basic unit operation data;
wherein analyzing the trend comprises:
analyzing the trend to detect presence or absence of an inflection point representing a point where a changing direction of the setting value changes from increase to decrease or a point where a changing direction of the setting value changes from decrease to increase;
wherein determining the operation method comprises:
dividing the successive operation period into a plurality of local periods as the inflection point is the partition in a case in which the inflection point exists in the successive operation period and determining the operation method based on the change amount which is difference between a first point and a last point in each local period;

determining that the operation method is a ramping operation for increase in a case in which the change amount is positive and is larger than a threshold value;

performing sign inversion on the change amount in a case in which the change amount is negative, and determine that the operation method is a ramping operation for decrease in a case in which the sign inverted change amount is larger than a threshold value; and determining that the operation method is fine-tuning in a case in which the operation method is not determined as the ramping operation for increase or the ramping operation for decrease.

15. An event analysis method according to claim 14, wherein collecting event log data arranged in time series; and analyzing one or more of event log data and extracting one or more of basic unit operation data.

16. A non-transitory computer readable storage medium that stores a computer program for causing, when executed by a computer, the computer to perform for a distributed control system (DCS) that controls operations in a plant:

collecting event log data representing operation history which the DCS operator performed;

analyzing event log data and extracting basic unit operation data representing a operation method operated by the DCS operator; and analyzing the basic unit operation data and extracting unit operation data representing an operation intention of the operation which the DCS operator performed, wherein analyzing the event log data comprises:

detecting, based on the event log data, a successive operation period in which operations for changing a setting value of the identical type for a single control system are performed continuously in time; and analyzing a trend representing transition of the setting value in the successive operation period;

wherein extracting the basic unit operation data comprises:

determining the operation method based on a change amount of the setting value, and thereby extracting the basic unit operation data;

wherein analyzing the trend comprises:

analyzing the trend to detect presence or absence of an inflection point representing a point where a changing direction of the setting value changes from increase to decrease or a point where a changing direction of the setting value changes from decrease to increase; and wherein determining the operation method comprises:

dividing the successive operation period into a plurality of local periods as the inflection point is the partition in a case in which the inflection point exists in the successive operation period and determining the operation method based on the change amount which is difference between a first point and a last point in each local period;

determining that the operation method is a ramping operation for increase in a case in which the change amount is positive and is larger than a threshold value;

performing sign inversion on the change amount in a case in which the change amount is negative, and determine that the operation method is a ramping operation for decrease in a case in which the sign inverted change amount is larger than a threshold value; and determining that the operation method is fine-tuning in a case in which the operation method is not determined as the ramping operation for increase or the ramping operation for decrease.

17. The non-transitory computer readable storage medium according to claim 16, wherein collecting a set of event log data arranged in time series;

analyzing one or more of event log data and extracting one or more of basic unit operation data.

* * * * *